United States Patent
Trundle

(10) Patent No.: US 11,087,420 B1
(45) Date of Patent: Aug. 10, 2021

(54) ENERGY SCORING

(71) Applicant: Alarm.com Incorporated, Vienna, VA (US)

(72) Inventor: Stephen Scott Trundle, Falls Church, VA (US)

(73) Assignee: Alarm.com Incorporated, Tysons, VA (US)

(*) Notice: Subject to any disclaimer, the term of this patent is extended or adjusted under 35 U.S.C. 154(b) by 646 days.

(21) Appl. No.: 14/642,319

(22) Filed: Mar. 9, 2015

Related U.S. Application Data

(60) Provisional application No. 61/949,653, filed on Mar. 7, 2014.

(51) Int. Cl.
| | |
|---|---|
| *G06Q 10/06* | (2012.01) |
| *G06Q 50/06* | (2012.01) |
| *G05F 1/66* | (2006.01) |
| *G05B 11/01* | (2006.01) |
| *G06Q 50/16* | (2012.01) |

(52) U.S. Cl.
CPC ........... *G06Q 50/163* (2013.01); *G06Q 10/06* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0306985 | A1* | 12/2008 | Murray | G06Q 10/10 |
| 2009/0089886 | A1* | 4/2009 | Cheng | F24F 11/30 |
| | | | | 726/34 |
| 2013/0204439 | A1* | 8/2013 | Scelzi | G06Q 10/00 |
| | | | | 700/276 |
| 2014/0129387 | A1* | 5/2014 | Kardell | G06Q 30/0641 |
| | | | | 705/26.61 |
| 2014/0279593 | A1* | 9/2014 | Pershing | G06Q 10/10 |
| | | | | 705/314 |

FOREIGN PATENT DOCUMENTS

WO   WO 2014142900 A1 *   9/2014   ........... G06T 7/0004

* cited by examiner

*Primary Examiner* — Aryan E Weisenfeld
*Assistant Examiner* — Wenren Chen
(74) *Attorney, Agent, or Firm* — Fish & Richardson P.C.

(57) ABSTRACT

Techniques are described for energy scoring of a monitored property and users of the monitored property. A system provides users with information related to the efficiency of the monitored property and aggregates data over multiple monitored properties. The system computes and outputs a score for a monitored property that reflects efficiency of the property and/or the users of the property. The system may track how that score changes through time, and how it relates to neighboring properties. The score may be expressed as both a number and a percentile.

9 Claims, 9 Drawing Sheets

400

Thermostats — 410

| Current Temp | Current Mode |
|---|---|
| 75° F | Cool (Schedules) |
| Update: < 10 Min. Ago | Target Temp: 85° F |

Change Mode — Change Target Temp
[Cool (Schedules) ▽] Set — [73 F ▽] Set

Local Weather — 420

Becoming Sunny
High/Low: 63°/38°
Day Precip: 0%
Evening Precip: 0%

| Thursday | Friday | Saturday |
|---|---|---|
| High: 69 | High: 81 | High: 87 |
| Low: 47 | Low: 63 | Low: 66 |
| Sunny | Cloudy | Rain |

430

/ Cool Schedules \ / Heat Schedules \ / Threshold Settings \ / Notifications \

|  | AM | | | | | | | | PM | | | | | | | | | | | | AM | | |
|---|---|---|---|---|---|---|---|---|---|---|---|---|---|---|---|---|---|---|---|---|---|---|---|---|
|  | 4 | 5 | 6 | 7 | 8 | 9 | 10 | 11 | 12 | 1 | 2 | 3 | 4 | 5 | 6 | 7 | 8 | 9 | 10 | 11 | 12 | 1 | 2 | 3 |
| Saturday | 82 | 82 | | | | | | | 78 | | | | | | 78 | | | | | | 78 | | | |
| Sunday | 82 | 82 | | | | | | | 78 | | | | | | 78 | | | | | | 78 | | | |
| Monday | 82 | 82 | | | | | | | 82 | | | | | | 78 | | | | | | 78 | | | |
| Tuesday | 82 | 82 | | | | | | | 82 | | | | | | 78 | | | | | | 78 | | | |
| Wednesday | 82 | 82 | | | | | | | 82 | | | | | | 78 | | | | | | 78 | | | |
| Thursday | 82 | 82 | | | | | | | 82 | | | | | | 78 | | | | | | 78 | | | |
| Friday | 82 | 82 | | | | | | | 82 | | | | | | 78 | | | | | | 78 | | | |

Thermostats , 410 , 420

| Current Temp | Current Mode |
|---|---|
| 75° F | Cool (Schedules) |
| Update: < 10 Min. Ago | Target Temp: 85° F |

| Change Mode | Change Target Temp |
|---|---|
| Cool (Schedules) ☑ Set | 73 F ☑ Set |

Local Weather

Becoming Sunny
High/Low: 63°/38°
Day Precip: 0%
Evening Precip: 0%

| Thursday | Friday | Saturday |
|---|---|---|
| High: 69 | High: 81 | High: 87 |
| Low: 47 | Low: 63 | Low: 66 |
| Sunny | Cloudy | Rain |

, 610

Cool Schedules / Heat Schedules / Threshold Settings / Notifications

Notify for the following event types  Recipients

☐ Temp crosses Low or High Threshold    User1

☐ Target Temp changes (unless by automated schedule)

☐ Thermostat Mode changes    iPhone Push Devices

FIG. 6

ENERGY SCORING

CROSS REFERENCE TO RELATED APPLICATIONS

The present application claims the benefit of U.S. Provisional Application No. 61/949,653, filed Mar. 7, 2014, which is incorporated herein by reference in its entirety for all purposes.

TECHNICAL FIELD

This disclosure relates to energy scoring technology.

BACKGROUND

Many people equip homes and businesses with monitoring systems to provide increased security and automation for their homes and businesses. Monitoring systems may include control panels that a person may use to control operation of the monitoring system, control sensors that monitor for security breaches, and control devices located within the property. In response to a monitoring system detecting a security breach, the monitoring system may generate an audible alert and, if the monitoring system is monitored by a monitoring service, the monitoring system may send electronic data to the monitoring service to alert the monitoring service of the security breach.

SUMMARY

Techniques are described for energy scoring.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

FIGS. 3-6 illustrate example interfaces for controlling devices at a property and viewing information related to operation of the devices.

DETAILED DESCRIPTION

Techniques are described for energy scoring for a monitored property and users of the monitored property. The techniques may involve a system that provides users with information related to the efficiency of the monitored property and also aggregates data over multiple (e.g., many) monitored properties. The system may compute and output a score for a monitored property that reflects efficiency of the property. The system may track how that score changes through time, and how it relates to neighboring properties. The score may be expressed as both a number and a percentile of the population.

In some implementations, the system may compute two scores related to efficiency of a monitored property. A first score may be a property efficiency score that indicates how well the property makes use of energy to provide a comfortable habitat. A second score may be a lifestyle efficiency score that indicates how careful occupants of the property (e.g., the home owner) are with lifestyle choices to conserve energy. The lifestyle efficiency score may be calculated and then periodically (e.g., constantly) adjusted from the time a thermostat that enables tracking is installed at the property. Over time, the occupants of the property may make lifestyle changes and those changes may update the lifestyle efficiency score for the property in near real-time.

In computing the property efficiency score, the system may first gather some user input information (e.g., via a mobile application) descriptive of attributes of the property. The attributes included in the user input may include size of house (e.g., square feet), percentage of shade cover (e.g., estimated in summer by a user at 10 am, 1 pm, and 4 pm), the number of stories at the property, the number of compressors at the property (e.g., to accommodate multiple thermostat properties), the type of heating and/or cooling equipment at the property (e.g., HVAC unit and model number), timing of installation and/or lifetime usage of heating and/or cooling equipment at the property (e.g., estimated year of HVAC unit installation), the exposure of the property, and any other attributes that may impact an amount of energy needed to maintain a comfortable environment at the property.

In some examples, the system may execute a thermodynamic efficiency model several times per year (e.g., once per quarter, but perhaps monthly during the first year) and calculate energy that is an input to the property using the thermostat as a proxy. Based upon all the information available, the system may calculate a score for the property and present the calculated score to the user. The system also may present ways to improve the score, and the estimated annual savings (e.g., in dollar value, kwh, $CO_2$ emissions, and $SO_2$ emissions) from making the recommended changes.

Figure 1:
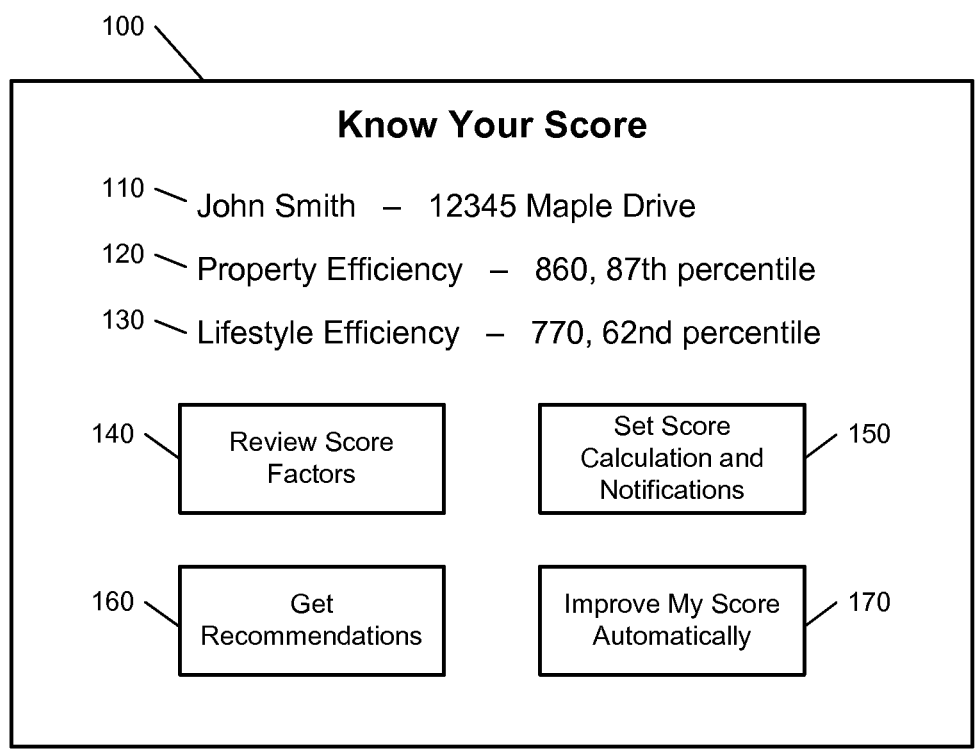
FIG. 1 illustrates an example interface for presenting energy scoring information.

FIG. 1 illustrates an example interface 100 for presenting energy scoring information. The interface 100 includes identification information 110 that identifies a user and an address of a property associated with the energy score information presented in the interface 100. The interface 100 also includes property efficiency score information 120 and lifestyle efficiency score information 130. The property efficiency score information 120 indicates how well the property makes use of energy to provide a comfortable habitat. The lifestyle efficiency score information 130 indicates how careful occupants of the property (e.g., the home owner) are with lifestyle choices to conserve energy. Each of the property efficiency score information 120 and the lifestyle efficiency score information 130 includes a numeric score and a percentile. As shown, the property efficiency score information 120 indicates a score of 860 (out of 1000) that puts the property in the eighty-seventh percentile for property efficiency of similar properties. The lifestyle efficiency score information 130 indicates a score of 770 (out of 1000) that puts the property in the sixty-second percentile for lifestyle efficiency of users with similar properties.

The interface 100 further includes input controls 140, 150, 160, and 170 that enable a user to perform an operation related to energy scoring for the property. For example, the input control 140 enables a user to review information on factors used in determining the property efficiency and lifestyle efficiency scores. Selection of the input control 140 causes display of another interface (or replaces the information displayed on the interface 100) that includes a description of the factors used in computing the property efficiency and lifestyle efficiency scores, which enables a user to better understand why certain score levels were obtained for the property.

The input control 150 enables a user to set a score calculation schedule and define when notifications related to energy scoring are provided. For instance, selection of the input control 150 causes display of another interface (or replaces the information displayed on the interface 100) that includes one or more user input controls that enable a user to establish or adjust a schedule for determining energy scores and to add, delete, or modify notification rules that define when notifications related to energy scoring are sent. The energy score calculation schedule may set how frequently energy scores are computed for the property, such as daily, weekly, monthly, quarterly, etc., and may specify the same or different schedules for the property efficiency and lifestyle efficiency scores. The notification rules may define when notifications related to energy scoring are sent to a mobile device of the user associated with the property. The notification rules may indicate that notifications should be sent periodically (e.g., quarterly), when an energy score meets a certain threshold (e.g., falls below a certain numeric score or percentile), and/or when a recommended course of action is expected to meet a threshold level of increased efficiency (e.g., a certain dollar value in savings).

The input control 160 enables a user to view recommendations for improving the property efficiency and lifestyle efficiency scores. Selection of the input control 160 causes display of another interface (or replaces the information displayed on the interface 100) that includes a description of one or more recommendations for improving the property efficiency and lifestyle efficiency scores. Recommendations for improving the property efficiency score may include recommending a new HVAC system, recommending replacing windows, doors, and/or insulation, or any other types of recommendations that could improve property efficiency. Recommendations for improving the lifestyle efficiency score may include recommending turning out lights when leaving the property, recommending setting a better schedule for thermostat control that minimizes energy consumption when the property is unoccupied, recommending unplugging energy consuming devices when not being used, recommending opening windows and turning off an HVAC system when the weather is nice, or any other types of recommendations that could improve lifestyle efficiency.

The input control 170 enables a user to have the system attempt to improve energy efficiency automatically. In response to selection of the input control 170, the system may adjust a thermostat schedule, may control lighting devices (and other energy consuming) in a manner that maximizes efficiency, and/or may order components or schedule services directed to improving efficiency of the property.

Figure 2:
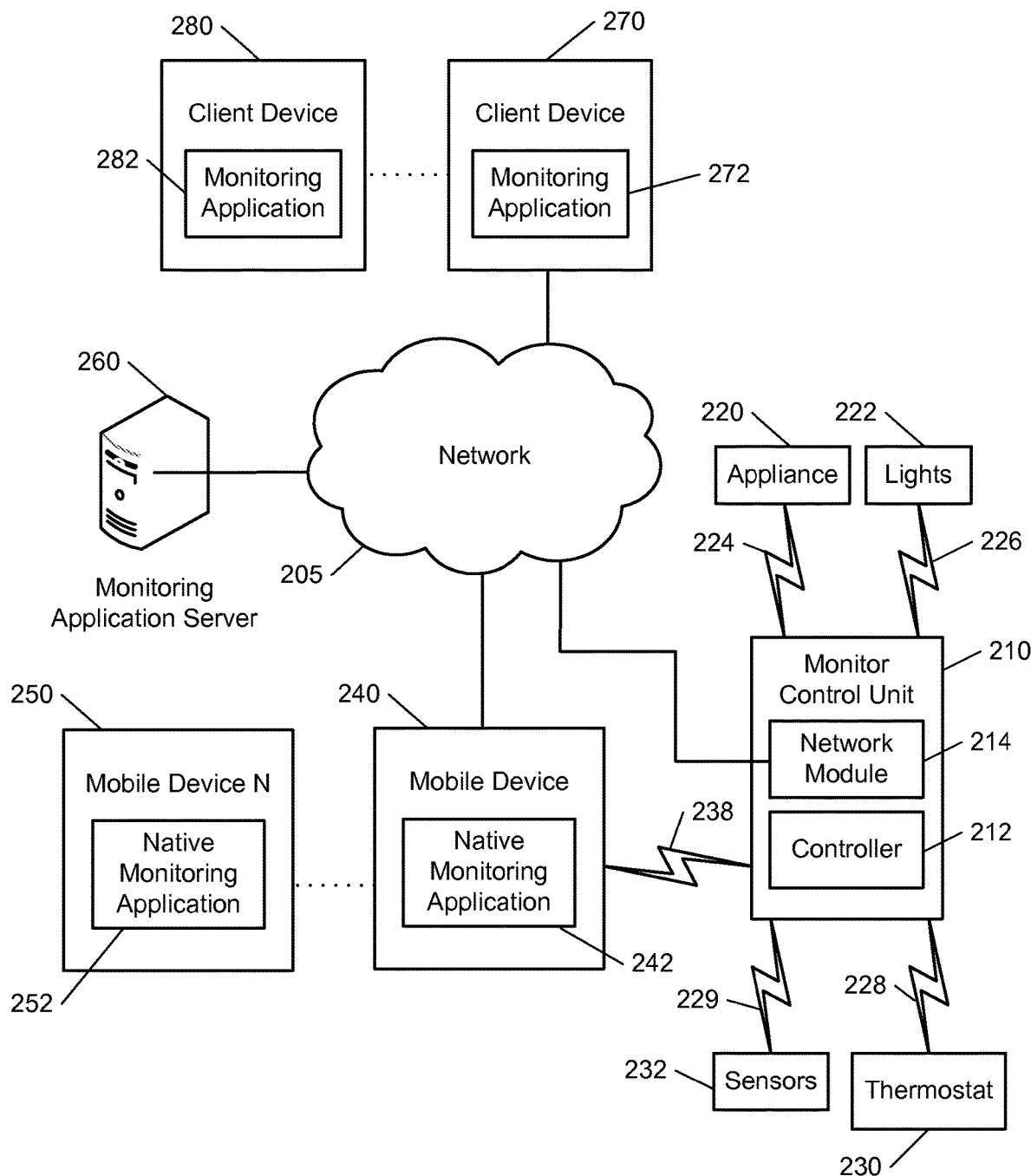
FIG. 2 is a block diagram of an example system.

FIG. 2 illustrates an example of an electronic system 200 configured to provide remote thermostat control/energy monitoring using devices. The electronic system 200 includes a network 205, a monitoring system control unit 210, one or more mobile devices 240, 250, a monitoring application server 260, and one or more client devices 270, 280. In some examples, the network 205 facilitates communications between the monitoring system control unit 210, the one or more mobile devices 240, 250, the one or more client devices 270, 280, and the monitoring application server 260.

The network 205 is configured to enable exchange of electronic communications between devices connected to the network 205. For example, the network 205 may be configured to enable exchange of electronic communications between the monitoring system control unit 210, the one or more mobile devices 240, 250, the one or more client devices 270, 280, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitoring system control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring system control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitoring system control unit 210 includes one or more sensors or detectors 232. For example, the monitoring system may include multiple sensors 232. The sensors 232 may include a contact sensor, a motion sensor, a glass break sensor, or any other type of sensor included in an alarm system or security system. The sensors 232 also may include an environmental sensor, such as a temperature sensor, a water sensor, a rain sensor, a wind sensor, a light sensor, a smoke detector, a carbon monoxide detector, an air quality sensor, etc. The sensors 232 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors may include a radio-frequency identification (RFID) sensor that identifies a particular article that includes a pre-assigned RFID tag. In addition, the sensors 232 may include a video/photographic camera or other type of optical sensing device configured to capture images and may include an energy consumption sensor for appliances and devices in a property monitored by the monitoring system.

The monitoring system control unit 210 communicates with modules 220, 222, and 230 and sensors 232 to perform thermostat control and energy monitoring. The module 220 is connected to one or more appliances, is configured to monitor energy consumption of the one or more appliances, and is configured to control operation of the one or more appliances. The module 220 may directly measure energy consumption of the one or more appliances or may estimate energy consumption of the one or more appliances based on detected usage of the one or more appliances. The module 220 may communicate energy monitoring information to the monitoring system control unit 210 and may control the one or more appliances based on commands received from the monitoring system control unit 210.

The module 222 is connected to one or more lighting systems, is configured to monitor energy consumption of the one or more lighting systems, and is configured to control operation of the one or more lighting systems. The module 222 may directly measure energy consumption of the one or more lighting systems or may estimate energy consumption of the one or more lighting systems based on detected usage of the one or more lighting systems. The module 222 may communicate energy monitoring information to the monitoring system control unit 210 and may control the one or more lighting systems based on commands received from the monitoring system control unit 210.

The module 230 is connected to a thermostat, is configured to monitor temperature and/or energy consumption of a temperature regulation system associated with the thermostat, and is configured to control operation of the thermostat. The module 230 may directly measure energy consumption of the temperature regulation system associated with the thermostat or may estimate energy consumption of the temperature regulation system associated with the thermostat based on detected usage of the temperature regulation system associated with the thermostat. The module 230 may communicate temperature and energy monitoring information to the monitoring system control unit 210 and may control the thermostat based on commands received from the monitoring system control unit 210.

The modules 220, 222, and 230 and sensors 232 communicate with the controller 212 over communication links 224, 226, 228, and 229, respectively. The communication links 224, 226, 228, and 229 may be a wired or wireless data pathway configured to transmit signals from the modules 220, 222, and 230 and sensors 232 to the controller 212. The modules 220, 222, and 230 and sensors 232 may continuously transmit sensed values to the controller 212, periodically transmit sensed values to the controller 212, or transmit sensed values to the controller 212 in response to a change in a sensed value.

The monitoring application server 260 is an electronic device configured to provide monitoring services by exchanging electronic communications with the monitoring system control unit 210, the one or more mobile devices 240, 250, and the one or more client devices 270, 280 over the network 205. For example, the monitoring application server 260 may be configured to monitor events generated by the monitoring system control unit 210. In this example, the monitoring application server 260 may exchange electronic communications with the network module 214 included in the monitoring system control unit 210 to receive information regarding alarm events detected by the monitoring system control unit 210. The monitoring application server 260 also may receive information regarding events from the one or more mobile devices 240, 250.

The monitoring application server 260 may store sensor (e.g., thermostat and energy consumption) data received from the monitoring system and perform analysis of sensor data received from the monitoring system. Based on the analysis, the monitoring application server 260 may communicate with and control aspects of the monitoring system control unit 210, the one or more mobile devices 240, 250, or the one or more client devices 270, 280.

The one or more mobile devices 240, 250 are devices that host and display user interfaces and that host one or more native applications (e.g., the native monitoring application 242, 252). The one or more mobile devices 240, 250 may be cellular phones or non-cellular locally networked devices with displays. The one or more mobile devices 240, 250 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The one or more mobile devices 240, 250 may be the same or may include mobile devices of different types. The one or more mobile devices 240, 250 may perform functions unrelated to the monitoring system, such as placing personal telephone calls, playing music, playing video, displaying pictures, browsing the Internet, maintaining an electronic calendar, etc.

The one or more mobile devices 240, 250 communicate with and receive monitoring system data from the monitoring system control unit 210 using the communication link 238. For instance, the one or more mobile devices 240, 250 may communicate with the monitoring system control unit 210 using various local wireless protocols such as wifi, Bluetooth, zwave, zigbee, HomePlug (ethernet over powerline), or wired protocols such as Ethernet and USB, to connect the one or more mobile devices 240, 250 to local security and automation equipment. The one or more mobile devices 240, 250 may connect locally to the monitoring system and its sensors and other devices. The local connection may improve the speed of status and control communications because communicating through the network 205 with a remote server (e.g., the monitoring application server 260) may be significantly slower.

Although the one or more mobile devices 240, 250 are shown as communicating with the monitoring system control unit 210, the one or more mobile devices 240, 250 may communicate directly with the sensors and other devices controlled by the monitoring system control unit 210. In some implementations, the one or more mobile devices 240, 250 replace the monitoring system control unit 210 and perform the functions of the monitoring system control unit 210 for local monitoring and long range/offsite communication.

In other implementations, the one or more mobile devices 240, 250 receive monitoring system data captured by the monitoring system control unit 210 through the network 205. The one or more mobile devices 240, 250 may receive the data from the monitoring system control unit 210 through the network 205 or the monitoring application server 260 may relay data received from the monitoring system control unit 210 to the one or more mobile devices 240, 250 through the network 205. In this regard, the monitoring application server 260 may facilitate communication between the one or more mobile devices 240, 250 and the monitoring system.

In some implementations, the one or more mobile devices 240, 250 may be configured to switch whether the one or more mobile devices 240, 250 communicate with the monitoring system control unit 210 directly (e.g., through link 238) or through the monitoring application server 260 (e.g., through network 205) based on a location of the one or more mobile devices 240, 250. For instance, when the one or more mobile devices 240, 250 are located close to the monitoring system control unit 210 and in range to communicate directly with the monitoring system control unit 210, the one or more mobile devices 240, 250 use direct communication. When the one or more mobile devices 240, 250 are located far from the monitoring system control unit 210 and not in range to communicate directly with the monitoring system control unit 210, the one or more mobile devices 240, 250 use communication through the monitoring application server 260.

Although the one or more mobile devices 240, 250 are shown as being connected to the network 205, in some implementations, the one or more mobile devices 240, 250 are not connected to the network 205. In these implementations, the one or more mobile devices 240, 250 communicate directly with one or more of the monitoring system components and no network (e.g., Internet) connection or reliance on remote servers is needed.

In some implementations, the one or more mobile devices 240, 250 are used in conjunction with only local sensors and/or local devices in a house. In these implementations, the system 100 only includes the one or more mobile devices 240, 250 and the modules 220, 222, and 230. The one or more mobile devices 240, 250 receive data directly from the modules 220, 222, and 230 and sends data directly to the modules 220, 222, and 230. The one or more mobile devices 240, 250 provide the appropriate interfaces/processing to provide monitoring information, generate alerts, modify settings, control the thermostat, lighting, and appliance devices, etc.

In other implementations, the system 200 further includes network 205 and the modules 220, 222, and 230 and sensors 232 are configured to communicate sensor data to the one or more mobile devices 240, 250 over network 205 (e.g., the Internet, cellular network, etc.). In yet another implementation, the modules 220, 222, and 230 and sensors 232 (or a component, such as a bridge/router) are intelligent enough to change the communication pathway from a direct local pathway when the one or more mobile devices 240, 250 are in close physical proximity to the modules 220, 222, and 230 and sensors 232 to a pathway over network 205 when the one or more mobile devices 240, 250 are farther from the modules 220, 222, and 230 and sensors 232. In some examples, the system leverages GPS information from the one or more mobile devices 240, 250 to determine whether the one or more mobile devices 240, 250 are close enough to the modules 220, 222, and 230 and sensors 232 to use the direct local pathway or whether the one or more mobile devices 240, 250 are far enough from the modules 220, 222, and 230 and sensors 232 that the pathway over network 205 is required. In other examples, the system leverages status communications (e.g., pinging) between the one or more mobile devices 240, 250 and the modules 220, 222, and 230 and sensors 232 to determine whether communication using the direct local pathway is possible. If communication using the direct local pathway is possible, the one or more mobile devices 240, 250 communicate with the modules 220, 222, and 230 and sensors 232 using the direct local pathway. If communication using the direct local pathway is not possible, the one or more mobile devices 240, 250 communicate with the modules 220, 222, and 230 and sensors 232 using the pathway over network 205.

The one or more mobile devices 240, 250 each include a native monitoring application 242, 252, respectively. The native monitoring application 242, 252 refers to a software/firmware program running on the corresponding mobile device that enables the user interface and features describe below. The one or more mobile devices 240, 250 may load or install the native monitoring application 242, 252 based on data received over a network or data received from local media. The native monitoring application 242, 252 runs on mobile devices platforms, such as iPhone, iPod touch, Blackberry, Google Android, Windows Mobile, etc.

The native monitoring application 242, 252 monitors and controls thermostat, lighting, and other energy-consuming appliances in a home, business, vacation or other property from anywhere. The native monitoring application 242, 252 enables users to easily monitor and control how much energy they are consuming. The native monitoring application 242, 252 also enables users to set up a comfortable environment with respect to temperature, lighting, etc.

In some implementations, the native monitoring application 242, 252 enables the mobile device to connect to thermostat(s) remotely and provide a user real-time, remote control of temperature in a building. For example, a user may take the user's mobile device on a business trip out of town. While the user is out of town, the weather at the user's home becomes unexpectedly hot. The user may use native monitoring application 242, 252 to control the thermostat(s) in the user's home to turn the air conditioning system on or adjust a temperature of the home to a desired level. In this example, when the temperature becomes hot and the user has a pet that remains in the home, the user may lower the temperature of the thermostat to cool the home to increase the comfort of the pet. Alternatively, when the temperature becomes hot and no one remains in the home, the user may increase the temperature of the thermostat to save on energy costs of cooling the home unnecessarily.

In some examples, the native monitoring application 242, 252 tracks the mobile device's physical location using GPS or other location protocols built into device and uses location tracking to control thermostat, lighting, and other energy-consuming appliances. For example, the native monitoring application 242, 252 may check location of the mobile device periodically and automatically detect when user is going toward or away from a home and sets thermostat, lights, appliances accordingly. For instance, when the user is detected as moving away from the home and lights remain on in the property, the native monitoring application 242, 252 may turn off the lights. When the user is detected is moving toward the home, the native monitoring application 242, 252 may turn on lights in the home, adjust the thermostat to a comfortable setting, and turn on useful appliances when the user is less than a threshold distance from the home.

The native monitoring application 242, 252 also may alert the user during time frames when their energy utility company is charging more or less for energy, so user can take action through the native monitoring application 242, 252. For instance, the native monitoring application 242, 252 may receive information related to utility company rates from the monitoring application server 260, from another source on the Internet, or from a user entering information related to utility company rates (e.g., a user entering monthly billing statements). The native monitoring application 242, 252 may store the rate information for use in alerting the user. The native monitoring application 242, 252 may periodically update the rate information. In using rate information to alert the user, the native monitoring application 242, 252 may provide an alert to the user when lights remain on in the home and the rate information indicates that the utility company is charging relatively high rates, but determine not to provide an alert to the user when lights remain on in the home and the rate information indicates that the utility company is charging relatively low rates. In another example, the native monitoring application 242, 252 may alert the user when the native monitoring application 242, 252 detects the user starting an appliance (e.g., a dishwasher) at a time when the rate is relatively high. In this example, if the user determines not to use the appliance at the time, the native monitoring application 242, 252 may offer to provide another alert to the user when the utility company rate drops or offer to automatically start the appliance when the utility company rate drops.

In further examples, native monitoring application 242, 252 may automatically change thermostat temperature on user behalf in response to utility pricing based on user settings. For instance, the native monitoring application 242, 252 may define rules for thermostat control based on user input. The rules may account utility pricing and prior energy consumption. For example, the native monitoring application 242, 252 may define a rule to automatically increase a temperature of a thermostat two degrees when the utility company rate is relatively high and the air conditioner is being used. In this example, the native monitoring application 242, 252 may automatically decrease the temperature of the thermostat two degrees when the utility company rate falls back to a relatively low rate and the air conditioner is still being used.

The native monitoring application 242, 252 further may account for prior monthly energy consumption in automatically setting temperatures. For instance, when monthly energy consumption has been relatively high, the native monitoring application 242, 252 may automatically increase a temperature of a thermostat two degrees when the utility company rate is relatively high and the air conditioner is being used. However, when monthly energy consumption has been relatively low, the native monitoring application 242, 252 may not automatically increase the temperature of the thermostat two degrees when the utility company rate is relatively high and the air conditioner is being used. Accounting for prior monthly energy consumption may assist a user in getting more consistent energy consumption bills and, therefore, may assist the user in budgeting monthly finances more accurately.

In some implementations, native monitoring application 242, 252 uses a real-time weather feed (e.g. from national weather service) to help guide intelligent, automated decision making on thermostat temperature. The native monitoring application 242, 252 may receive weather information from the monitoring application server 260 or from another source on the Internet. The native monitoring application 242, 252 may periodically update the weather information or receive weather related alerts. The native monitoring application 242, 252 may account for the weather information in automatically controlling thermostat, lighting, and other energy-consuming appliances and providing alerts to the user. For instance, in the example discussed above in which the weather at a user's home becomes unexpectedly hot when the user is out of town, the native monitoring application 242, 252 may detect that the weather has become unexpectedly hot based on the weather feed information and alert the user.

The native monitoring application 242, 252 may include detailed and summary indoor/outdoor temperature and humidity reports to show users how they are setting temperature at various times of day. The reports could cross reference to money paid for energy at given time of day. The report data may be based on user input or automatically received or accessed from a utility company. For instance, users may manually enter their energy bill amount into the native monitoring application 242, 252 each month to get pulled into reporting, or accept a feed from the utility company.

The native monitoring application 242, 252 may monitor sunrise/sunset times and automatically turn specified lights on/off at dusk/dawn. For instance, the native monitoring application 242, 252 may receive information related to sunrise/sunset times from the monitoring application server 260 or from another source on the Internet and store the information for use in controlling lights.

The native monitoring application 242, 252 may provide user-defined schedules for controlling wake-up and turn-down schemes. For instance, at wake-up time, the native monitoring application 242, 252 may turn on a bedroom light, change a thermostat setting to a day setting, and turn on a coffee maker. At turn-down time, the native monitoring application 242, 252 may turn off a bedroom light, change a thermostat setting to a night setting, and arm an alarm system to a "Stay" mode.

The native monitoring application 242, 252 may operate in Home Mode, Away-Work Mode, Away-Vacation Mode and other user defined modes that control temperature, light, appliance behavior. The native monitoring application 242, 252 may define the modes and settings corresponding to the modes based on user input. The native monitoring application 242, 252 also may switch between the modes based on user input or may automatically switch between modes based on factors, such as location of the mobile device and status of an alarm system at one or more locations.

The native monitoring application 242, 252 may work as a local remote control device for use when on or near the premises. Alternatively, the native monitoring application 242, 252 may work as a long-range remote control that could work from anywhere in the world for long-range wireless protocols (e.g., GSM, CDMA, WiMax, etc.) via remote servers, such as the monitoring application server 260.

The native monitoring application 242, 252 also may implement a permission system that provides a different level of control for different users. For instance, parent users may have full control of the monitoring system and a child user may have limited control (e.g., the child user may be able to control lighting systems, but may not be able to control appliances). The permission system may be implemented based on user-specific passcodes or particular mobile devices may be assigned to particular users.

In implementations in which multiple mobile devices are included in the system 100, the native monitoring application 242, 252 may include rules that govern input from which of the multiple devices controls when conflicting input is received. For instance, when a parent user is attempting to perform a first action (e.g., raise temperature) and a child user is attempting to perform a second, different action that conflicts with the first action (e.g., lower temperature), the rules of the native monitoring application 242, 252 (or monitoring system in general) may perform only the first action because the parent user has higher priority than the child user.

The one or more client devices 270, 280 may be any type of client devices (e.g., personal computers) that are capable of performing operations similar to those described as being performed by the one or more mobile devices 240, 250. The one or more client devices 270, 280 operate a monitoring application 272, 282 either locally or over a network. The monitoring application 272, 282 may be similar to the native monitoring application 242, 252 operated by the one or more mobile devices 240, 250.

Figure 3:
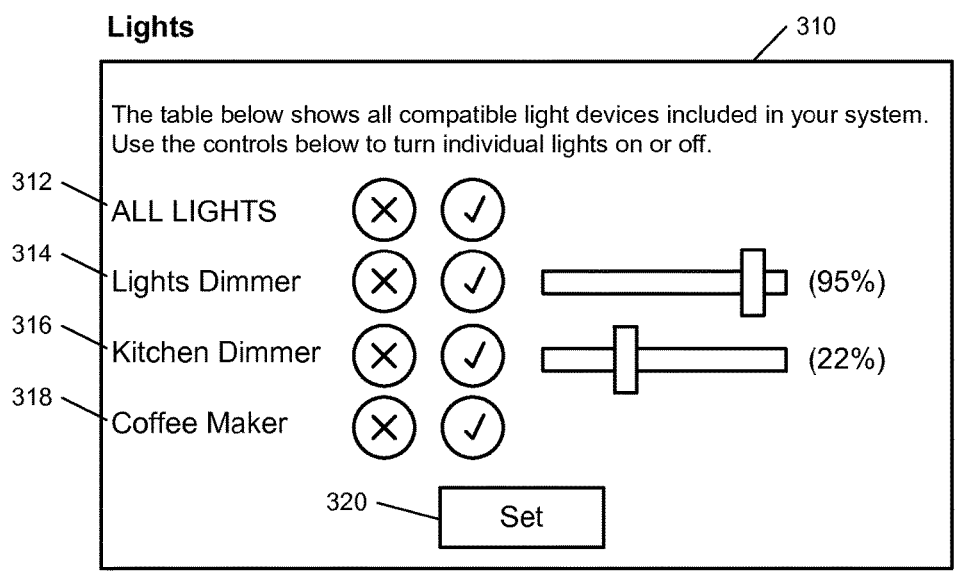

FIG. 3 illustrates an interface 300 that enables user control over lighting devices and other appliances from a remote location. The interface 300 may be presented over a network (e.g., as a webpage on a personal computer) or may be displayed by an application that operates on a device (e.g., displayed by a native monitoring application on a mobile device). The interface 300 includes a lights (and other appliances) area 310. The area 310 includes controls 312 for controlling all lights within a property. As shown, the controls 312 include a first control that causes all lights within a property to be turned off and a second control that causes all lights within a property to be turned on.

The area 310 also includes controls 314 for controlling lights associated with a lights dimmer. The controls 314 include a first control that causes the lights associated with the lights dimmer to be turned off, a second control that causes the lights associated with the lights dimmer to be turned on, and a third control that controls a dimmer setting for the lights associated with the lights dimmer when turned on. The third control includes a slide bar that allows a user to set a dimmer percentage setting, which is shown adjacent to the slide bar.

The area 310 further includes controls 316 for controlling lights associated with a kitchen dimmer (e.g., lights positioned within a kitchen). The controls 316 include a first control that causes the lights associated with the kitchen dimmer to be turned off, a second control that causes the lights associated with the kitchen dimmer to be turned on, and a third control that controls a dimmer setting for the lights associated with the kitchen dimmer when turned on. The third control includes a slide bar that allows a user to set a dimmer percentage setting, which is shown adjacent to the slide bar.

In addition, the area 310 includes controls 318 for controlling a coffee maker. The controls 318 include a first control that causes the coffee maker to be turned off and a second control that causes the coffee maker to be turned on. Other types of devices and appliances may be controlled in a manner similar to the control of the coffee maker.

The interface 300 includes a scheduled automation area 330 and an event-triggered automation area 340. The scheduled automation area 330 displays time schedule automation that has been set for one or more devices controlled through the interface 300 and enables a user to add, delete, or change scheduled automations. As shown, a scheduled automation has been set for the lights dimmer to turn on at 10:00 PM and turn off at 7:00 AM every day of the week.

The event-triggered automation area 340 displays event-triggered automation that has been set for one or more devices controlled through the interface 300 and enables a user to add, delete, or change event-triggered automations. As shown, an event-triggered automation has been set for the lights dimmer to turn on for two minutes when a door sensor positioned on a work door closes. Any other types of time schedule and event-triggered automations may be set using the interface areas 330 and 340.

FIG. 4 illustrates an interface 400 that enables user control over a thermostat from a remote location. The interface 400 may be presented over a network (e.g., as a webpage on a personal computer) or may be displayed by an application that operates on a device (e.g., displayed by a native monitoring application on a mobile device). The interface 400 includes a thermostats area 410. The area 410 displays a current temperature measured by the thermostat, a current mode set for the thermostat, an indication of when the thermostat measurements were last updated, and a target temperature the thermostat is attempting to maintain at the property. The area 410 also includes a control that allows a user to set an operating mode of the thermostat and a control that allows a user to set a target temperature for the thermostat.

The interface 400 also includes a weather area 420. The weather area 420 displays a forecast of the current local weather at the property that is being monitored.

The interface further includes a heat schedules tab 430. The heat schedules tab 430 displays a timing schedule for the thermostat, which shows the target temperature set for time periods within a day for each day of the week. The timing schedule is used to change the target temperature of the thermostat throughout the course of a day when the heat schedule mode is set for the thermostat. The heat schedules tab 430 may enable a user to change the target temperatures and time ranges included in the heat schedule. The cool schedules tab may be similar to the heat schedules tab 430, but with target temperature data for the cool schedule mode.

Figure 5:
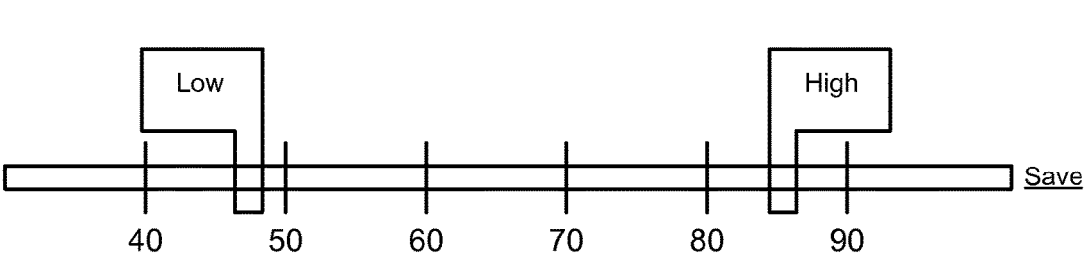

FIG. 5 illustrates an interface 500 that shows the interface 400 after the threshold settings tab 510 has been selected. The threshold settings tab 510 displays threshold temperatures set for the thermostat and controls that change the thresholds. Specifically, the threshold settings tab 510 includes a low temperature threshold control and a high temperature threshold control. The low temperature threshold control enables a user to set a low temperature threshold and the high temperature threshold control enables a user to set a high temperature threshold. The thermostat maintains the temperature at the property to be at or above the low temperature threshold and at or below the high temperature threshold at all times regardless of other energy conservation efforts being taken with respect to the property.

FIG. 6 illustrates an interface 600 that shows the interface 500 after the notifications tab 610 has been selected. The notifications tab 610 displays notifications set based on thermostat events. The notifications include an event portion that defines the thermostat event that triggers the notification and a recipient portion that defines the recipients of the notification. The monitoring system monitors for the thermostat events defined in the event portion and sends a notification to users identified in the recipient portion when a thermostat event is detected. The notifications tab 610 may enable a user to add, delete, or change set notifications.

Figure 7:
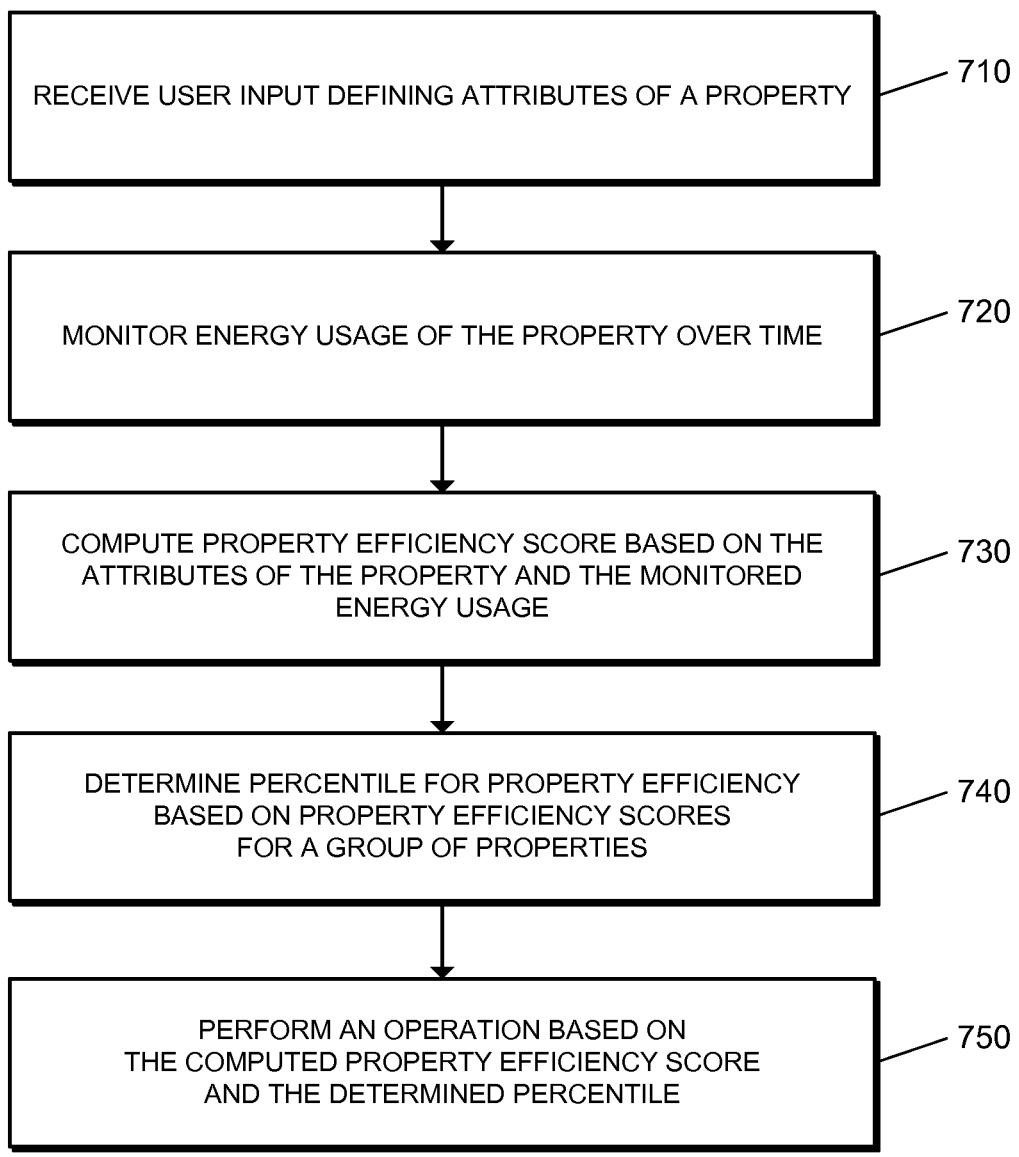
FIGS. 7-9 are flowcharts illustrating example processes.
Figure 8:
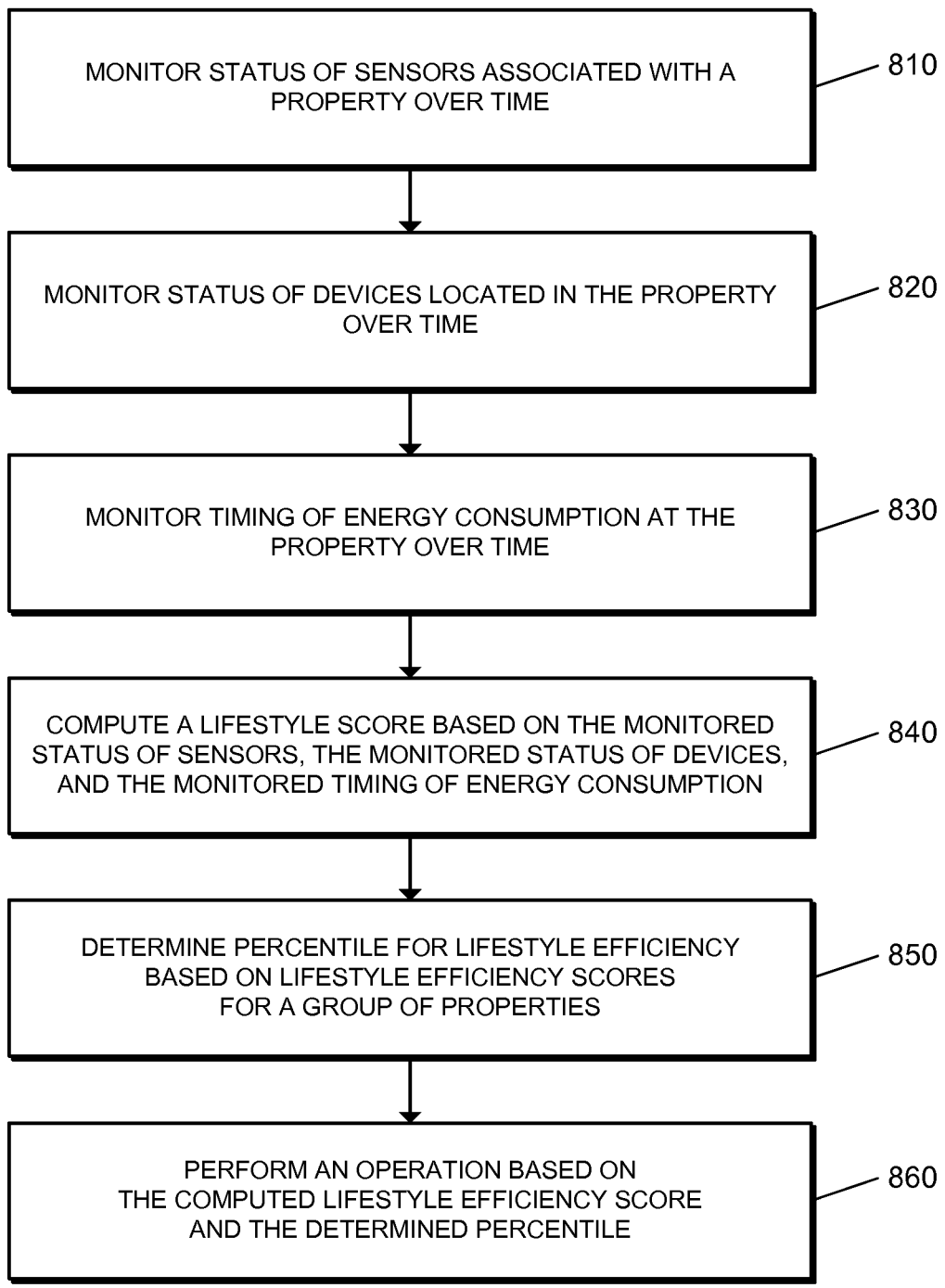
Figure 9:
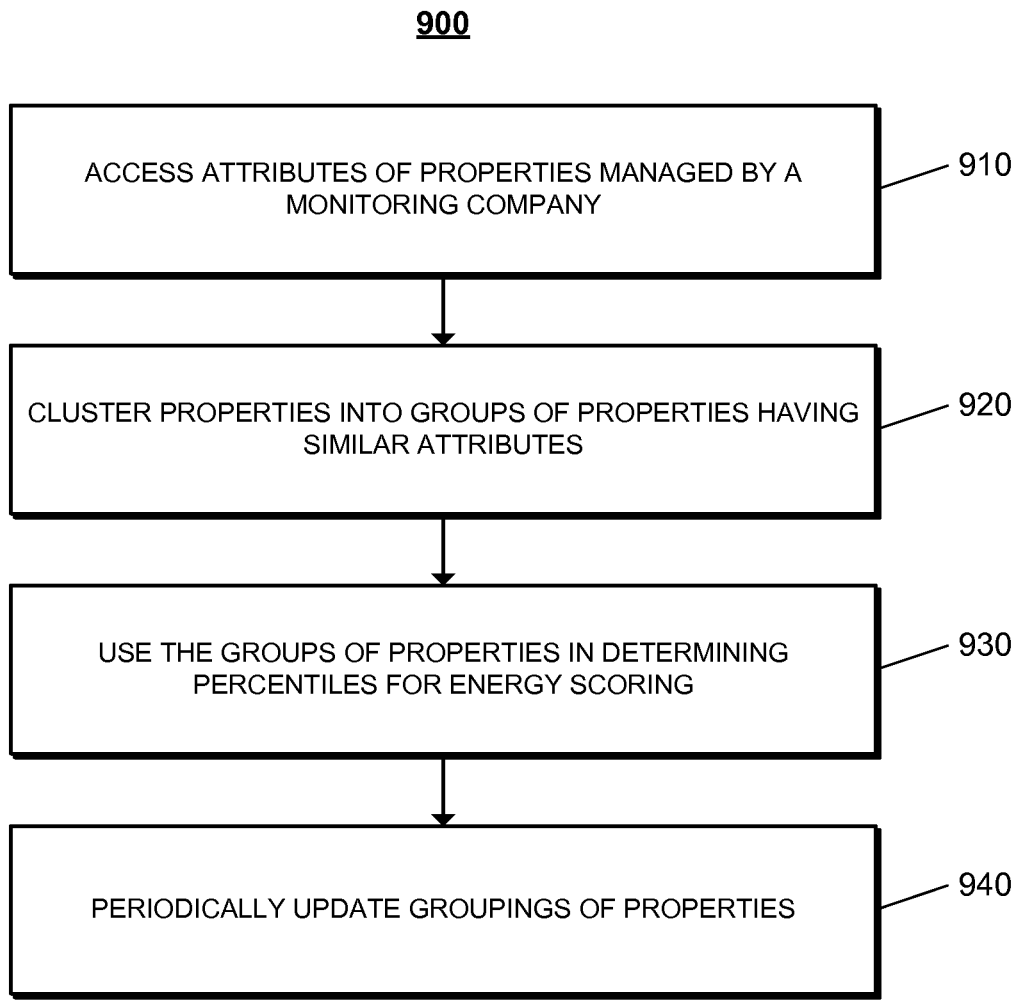

FIGS. 7-9 illustrate example processes. The operations of the example processes are described generally as being performed by the system 200. The operations of the example processes may be performed by one of the components of the system 200 (e.g., the monitoring application server 260) or may be performed by any combination of the components of the system 200. In some implementations, operations of the example processes may be performed by one or more processors included in one or more electronic devices.

FIG. 7 illustrates an example process 700 for property efficiency scoring. The system 200 receives user input defining attributes of a property (710). For example, the system 200 receives user input provided by a user that identifies attributes of a property that relate to energy needed for the property. The system 200 may receive the user input in any suitable manner, such as receiving the user input from a mobile device that operates a mobile application to which the user provides the input or receiving the user input from a computer that presents a website to which the user provides the input. The attributes of the property may include size of the property (e.g., square footage), percentage of shade cover for the property (e.g., estimated in summer by a user at 10 am, 1 pm, and 4 pm), the number of stories at the property, the number of compressors at the property (e.g., to accommodate multiple thermostat properties), the type of heating and/or cooling equipment at the property (e.g., HVAC unit and model number), timing of installation and/or lifetime usage of heating and/or cooling equipment at the property (e.g., estimated year of HVAC unit installation), the exposure of the property, activity level in the property, type of insulation at the property, types of windows and doors at the property, age of insulation, windows, and doors, age of caulk applied to exterior portions of the property, types of construction materials used in the property (e.g., wood, stone, brick, etc.), age of construction of the property, latitude and longitude measurements for the property, whether the property includes a basement, and any other attributes that may impact an amount of energy needed to maintain a comfortable environment at the property.

The system 200 monitors energy usage of the property over time (720). For example, the system 200 determines an amount of energy consumed at the property over time and tracks the amount of energy consumed at the property over time in electronic storage. The system 200 may receive the amount of energy consumed at the property from an energy provider or may receive the amount of energy consumed at the property from user input provided by a user based on a monthly statement provided to the user by an energy provider. The system 200 also may measure the amount of energy consumed at the property. For instance, the system 200 may measure the total amount of energy consumed at the property or may measure the amount of energy consumed by various devices within the property (e.g., a thermostat, an oven, a dishwasher, a range, a washer and dryer, a hot water heater, a television, a computer, etc.). The system 200 may determine the amount of energy as a number of kilowatt hours tracked at a thermostat in the property. The system 200 may continuously monitor energy usage or may periodically monitor energy usage (e.g., track daily or monthly energy usage values).

The system 200 computes a property efficiency score based on the attributes of the property and the monitored energy usage (730). For example, the system 200 may use the attributes of the property and the energy usage amount as inputs to an equation that outputs the property efficiency score. In this example, the system 200 may apply various weightings to the attributes of the property and use the weighted outputs to adjust the energy usage amount into a numeric score that reflects efficiency of the property. The system 200 may adjust the weightings over time based on data collected that provides a better understanding of how certain attributes impact energy usage at properties.

In computing the property efficiency score, the system 200 may provide a higher score to reflect efficient usage and, as such, a lower energy usage amount would translate to a higher score and a higher energy usage amount would translate to a lower score. In addition, the attributes of the property that would result in lower expected energy usage at the property would contribute to lowering the score (e.g., a property with a large amount of shade coverage would have a lower score than a similar property that uses the same amount of energy, but does not have shade coverage). The attributes of the property that would result in higher expected energy usage at the property would contribute to raising the score (e.g., a property with a high activity level would have a higher score than a similar property that uses the same amount of energy, but does not have a high activity level). In this regard, the system 200 generates a numeric score on a certain scale that represents efficiency of the property.

The system 200 determines a percentile for property efficiency based on property efficiency scores for a group of properties (740). For instance, the system 200 computes property efficiency scores for several (e.g., many) properties and determines a percentile that reflects how well the property under consideration compares to other properties. The group of properties may include all properties managed by a monitoring company or a subset of properties managed by the monitoring company that are located within a threshold distance of the property under consideration. The group of properties also may include properties that have similar attributes as the property under consideration such that the percentile does not account for properties that have significantly different energy efficiency characteristics as the property under consideration. The system 200 may use the techniques described below with respect to FIG. 9 to identify the group of properties used in determining the percentile.

The system 200 performs an operation based on the computed property efficiency score and the determined percentile (750). For example, the system 200 may store, in electronic storage, the computed property efficiency score and the determined percentile and track property efficiency scores and percentiles for the property over time. In this example, the system 200 may generate reports about the property's efficiency over time and present the reports in a manner that enables a user at the property to evaluate changes in the property's efficiency over time. In addition, the system 200 may compare changes in the property's efficiency to one or more thresholds and provide alerts to a user at the property based on the changes in the property's efficiency meeting the one or more thresholds (e.g., providing an alert based on the property efficiency score and/or percentile falling below a threshold or providing an alert based on a monthly change in the property efficiency score and/or percentile exceeding a threshold).

In some implementations, the system 200 outputs (e.g., displays) the computed property efficiency score and the determined percentile. In these implementations, the system 200 also may determine recommendations for improving the property efficiency score and percentile and output the determined recommendations with the computed property efficiency score and the determined percentile. For instance, the system 200 may evaluate the attributes of the property, identify those attributes that may be contributing to inefficiency and that can be changed, and recommend changing the attributes to more efficient options. The system 200 also may evaluate attributes of other properties relative to property efficiency scores, identify inefficient attributes that are common in inefficient properties, and identify efficient attributes that are common in efficient properties. The system 200 may compare the inefficient attributes and the efficient attributes to the attributes of the property and, based on the comparison, determine whether the property has any of the inefficient attributes or lacks any of the efficient attributes. Based on the determinations, the system 200 may recommend changing the inefficient attributes possessed by the property and/or adding the efficient attributes that the property lacks. The recommendations may include updating the HVAC system at the property, scheduling maintenance on the HVAC system at the property, upgrading the windows, doors, or insulation at the property, re-caulking exterior portions of the property, or any other recommendations related to improving efficiency at the property.

In some examples, the system 200 may automatically initiate a change to the property based on the computed property efficiency score and the determined percentile. In these examples, the system 200 may automatically initiate a change to the property based on the computed property efficiency score and/or the determined percentile falling below a threshold. In initiating a change to the property, the system 200 may order a component or service for the property (e.g., order new insulation) or schedule a service to evaluate the property (e.g., schedule an HVAC repair company to come inspect the HVAC system at the property or schedule a window company to provide an estimate for upgrading windows at the property).

FIG. 8 illustrates an example process 800 for lifestyle efficiency scoring. The system 200 monitors status of sensors associated with a property over time (810). For example, the system 200 monitors the status of all of the sensors associated with the system 200 and tracks values sensed by the sensors. In this example, the system 200 may track and store sensor values over time to generate a log of sensor activity at the property. The system 200 may analyze the log to assess activity level within the property, as well as timing of various events at the property. For instance, the system 200 may track the occurrence and timing of door openings and closings, window openings and closings, user presence at the property, user absence from the property, sleeping at the property, exercising at the property, or any other events that the system 200 is capable of detecting at the property.

The system 200 monitors status of devices located in the property over time (820). For instance, the system 200 monitors whether devices are powered on and being used. The system 200 may track when lights are turned off and turned on, how long an oven is operated, whether computers and televisions at the property are powered on or off, settings and operation of the thermostat, and operational status of any other devices at the property. Similar to monitoring sensor status, the system 200 may monitor the status of all of the devices associated with the property that the system 200 is capable of monitoring and track operational status of the devices. The system 200 may track and store status values over time to generate a log of device status at the property. The system 200 may analyze the log to assess overall device usage within the property, as well as timing of various status events for devices at the property.

The system 200 monitors timing of energy consumption at the property over time (830). For example, the system 200 determines an amount of energy consumed at the property over time and tracks the amount of energy consumed at the property over time in electronic storage with timing data that reflects when the energy was consumed. The system 200 may receive the amount of energy consumed at the property from an energy provider or may receive the amount of energy consumed at the property from user input provided by a user based on a monthly statement provided to the user by an energy provider. The system 200 also may measure the amount of energy consumed at the property. For instance, the system 200 may measure the total amount of energy consumed at the property or may measure the amount of energy consumed by various devices within the property (e.g., a thermostat, an oven, a dishwasher, a range, a washer and dryer, a hot water heater, a television, a computer, etc.). The system 200 may determine the amount of energy as a number of kilowatt hours tracked at a thermostat in the property. The system 200 may continuously monitor energy usage or may periodically monitor energy usage (e.g., track daily or monthly energy usage values). The system 200 may store the energy consumption data in a log with timing information such that the energy consumption may be compared against sensor and device status.

The system 200 computes a lifestyle score based on the monitored status of sensors, the monitored status of devices, and the monitored timing of energy consumption (840). For example, the system 200 may compare the monitored status of sensors, the monitored status of devices, and the monitored timing of energy consumption and, based on the comparison, determine whether the energy consumption at the property overlaps with activity at the property and/or device usage at the property. In this example, the system 200 may consider energy consumption that does overlap with activity at the property and/or device usage at the property as efficient and energy consumption that does not overlap with activity at the property and/or device usage at the property as inefficient. In this regard, the system 200 may determine a percentage of time that energy consumption overlaps with activity at the property and/or device usage at the property and compute a lifestyle efficiency score based on the determined percentage.

In addition, the system 200 may compare the monitored status of sensors, the monitored status of devices, and the monitored timing of energy consumption and, based on the comparison, determine instances in which the users at the property are acting in a manner that is energy efficient or energy inefficient. The system 200 may determine whether users are leaving windows or doors open during times when the thermostat is cooling the property, determine whether users are using the thermostat to maintain a comfortable temperature at the property during times when the property is not occupied, determine whether users are leaving lights on during times when the property is not occupied, determine whether users are leaving an oven on over a period that is longer than typical cooking times, determine whether users are leaving devices powered on when the devices are not in use, or determine any other actions that may be deemed as efficient or inefficient in terms of energy consumption. The system 200 then may determine a percentage of the user actions that are efficient versus inefficient and compute a lifestyle efficiency score based on the determined percentage.

In some implementations, the system 200 may use the monitored status of sensors, the monitored status of devices, the monitored timing of energy consumption, and/or any information derived from the monitored data as inputs to an equation that outputs the lifestyle efficiency score. In these implementations, the system 200 may apply various weightings to the inputs and use the weighted outputs to adjust the energy usage amount into a numeric score that reflects efficiency of use of the property. The system 200 may adjust the weightings over time based on data collected that provides a better understanding of how certain lifestyle choices impact energy usage at properties.

The system 200 determines a percentile for lifestyle efficiency based on lifestyle efficiency scores for a group of properties (850). For instance, the system 200 computes lifestyle efficiency scores for several (e.g., many) properties and determines a percentile that reflects how well the property under consideration compares to other properties. The group of properties may include all properties managed by a monitoring company or a subset of properties managed by the monitoring company that are located within a threshold distance of the property under consideration. The group of properties also may include properties that have similar attributes as the property under consideration such that the percentile does not account for properties that have significantly different energy efficiency characteristics as the property under consideration. The system 200 may use the techniques described below with respect to FIG. 9 to identify the group of properties used in determining the percentile.

The system 200 performs an operation based on the computed lifestyle efficiency score and the determined percentile (860). For example, the system 200 may store, in electronic storage, the computed lifestyle efficiency score and the determined percentile and track lifestyle efficiency scores and percentiles for the property over time. In this example, the system 200 may generate reports about the lifestyle efficiency over time and present the reports in a manner that enables a user at the property to evaluate changes in the lifestyle efficiency over time. In addition, the system 200 may compare changes in the lifestyle efficiency to one or more thresholds and provide alerts to a user at the property based on the changes in the lifestyle efficiency meeting the one or more thresholds (e.g., providing an alert based on the lifestyle efficiency score and/or percentile falling below a threshold or providing an alert based on a monthly change in the lifestyle efficiency score and/or percentile exceeding a threshold).

In some implementations, the system 200 outputs (e.g., displays) the computed lifestyle efficiency score and the determined percentile. In these implementations, the system 200 also may determine recommendations for improving the lifestyle efficiency score and percentile and output the determined recommendations with the computed lifestyle efficiency score and the determined percentile. For instance, the system 200 may evaluate the actions of users at the property, identify those actions that may be contributing to inefficiency and that can be changed, and recommend changing the actions to more efficient actions. The system 200 also may evaluate actions of users at other properties relative to lifestyle efficiency scores, identify inefficient actions that are common in inefficient properties, and identify efficient actions that are common in efficient properties. The system 200 may compare the inefficient actions and the efficient actions to the actions at the property and, based on the comparison, determine whether users at the property are performing any of the inefficient lifestyle or failing to perform any of the efficient actions. Based on the determinations, the system 200 may recommend changing the inefficient actions and/or adding the efficient actions. The recommendations may include changing a thermostat schedule, turning lights off when the property is unoccupied, using an oven for a duration that corresponds more closely to the time needed to cook food, turning device off when not in use, or any other recommendations related to improving efficient usage of the property.

In some examples, the system 200 may automatically initiate a change to home automation settings for the property based on the computed lifestyle efficiency score and the determined percentile. In these examples, the system 200 may automatically initiate a change to home automation settings for the property based on the computed property efficiency score and/or the determined percentile falling below a threshold. In initiating a change to home automation settings for the property, the system 200 may automatically adjust the schedule of a thermostat at the property to more closely align the schedule to when heating or cooling is needed, may automatically turn off lights when the property is unoccupied, may automatically provide an alert when a window is left open for a threshold period of time when the thermostat is cooling the property, and may automatically turn off a device when the device has not been used for a threshold period of time.

FIG. 9 illustrates an example process 900 for grouping properties for scoring. The system 200 accesses attributes of properties managed by a monitoring company (910). For instance, the system 200 accesses attributes of a property that relate to energy needed for the property. The attributes of the property may be the same as the attributes discussed above with respect to reference numeral 710.

The system 200 clusters properties into groups of properties having similar attributes (920). For instance, the system 200 uses a clustering process to group the properties into multiple, different groups of properties that have similar characteristics. The system 200 may perform the clustering based on the comparison of attributes of the properties. The system 200 may perform clustering by assigning a set of properties into groups (called clusters), so that the sample properties in the same cluster are more similar (in some sense or another) to each other than to those in other clusters.

Any type of one or more clustering processes may be used to arrange the properties into groups having similar characteristics. For instance, the system 200 may use a machine learning process to group properties with similar characteristics together. Example clustering processes the system 200 may use include one or more of connectivity-based clustering processes (e.g., hierarchical clustering processes), such as single-linkage clustering, complete linkage clustering, and average linkage clustering, centroid-based clustering processes, such as k-means clustering, k-medians clustering, and Fuzzy c-means clustering, distribution-based clustering processes, such as expectation-maximization (EM) clustering and mixture of Gaussians clustering, and density-based clustering processes, such as density-based spatial clustering of applications with noise (DBSCAN) and ordering points to identify the clustering structure (OPTICS).

The system 200 uses the groups of properties in determining percentiles for energy scoring (930). For instance, the system 200 uses the groups of properties in determining percentiles for property efficiency scoring and lifestyle efficiency scoring, as described above with respect to reference numerals 740 and 850, respectively.

The system 200 periodically updates groupings of properties (940). For example, the system 200 may perform clustering of properties on a periodic interval. In this example, the system 200 may perform clustering quarterly or monthly to update the groupings to account for changing attributes of properties and addition of new properties. The system 200 also may perform clustering to update the groupings based on certain events occurring. For instance, the system 200 may perform clustering based on a threshold number of new properties being available or based on a threshold number of new or changed attributes of properties being available.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made and additional useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. An electronic system comprising:
   at least one processor; and
   at least one computer-readable storage medium coupled to the at least one processor having stored thereon instructions which, when executed by the at least one processor, causes the at least one processor to perform operations comprising:
   providing, by a control unit of the electronic system, an interface comprising a plurality of input controls that permit a user to customize a manner by which the electronic system monitors energy efficiency at a property, wherein:
      the plurality of input controls comprises (i) a first input control for specifying a frequency with which the electronic system computes one or more energy efficiency scores for the property and (ii) a second input control for specifying how the electronic system provides notifications corresponding to the one or more efficiency scores computed for the property;
      a level of customization permitted through the interface is based on permission settings of a user that accesses the interface;
   receiving, by the control unit and through the interface, a user input, wherein:
      the user input indicates (i) attributes of the property, (ii) a set of preferences, specified by the user, for desired lighting or temperature conditions within the property, (iii) a monitoring schedule with a user-specified frequency for computing the one or more efficiency scores based on interaction with the first input control by the user, and (iv) a user-specified notification preference for providing data to the user based on interaction with the second input control by the user, and
      the control unit is configured to control one or more devices that are monitored by the electronic system based on sensor data collected by one or more sensors of the electronic system located within the property;
   obtaining, by the control unit, sensor data collected by the one or more sensors, the sensor data identifying the one or more devices that are monitored by the electronic system;
   processing, by the control unit, the obtained sensor data with respect to the set of preferences to determine, over a particular time period, energy usage of the one or more devices associated with usage of the one or more devices by the user;
   determining, by the control unit and according to the monitoring schedule, an amount of energy used to maintain, at the property over the particular time period, the desired lighting or temperature conditions specified by the user based on (i) the usage of the one or more devices by the user and (ii) the energy usage of the one or more devices over the particular time period;
   determining, by the control unit, that the usage of the one or more devices by the user is energy inefficient based on the attributes of the property, the set of preferences for the desired lighting or temperature conditions within the property, and the amount of energy used to maintain the desired lighting or temperature conditions;
   providing, by the control unit and for output through the interface, a recommendation to change the desired lighting or temperature conditions specified by the user based on the usage of the one or more devices by the use r that was determined to be energy inefficient; and automatically initiating, by the control unit, a change based on the recommendation to the property based on the determined amount of energy and the determined usage of the one or more devices by the user.

2. The system of claim 1, wherein the operations further comprise:
   tracking the determined amount of energy and the usage of the one or more devices by the user overtime; and
   presenting the determined amount of energy and the usage of the one or more devices by the user tracked overtime through the interface in a manner that enables the user at the property to perceive changes in the property's efficiency overtime.

3. The system of claim 1, wherein the operations further comprise:
   receiving, by the control unit and through the interface, user input requesting display of factors involved in determining the amount of energy; and
   based on the user input requesting display of the factors involved in determining the amount of energy, displaying, by the control unit, the factors involved in determining the amount of energy through the interface.

4. The system of claim 1, wherein the operations further comprise:
   receiving, by the control unit and through the interface, user input requesting adjustment of a schedule for energy scoring; and
   based on the user input requesting adjustment of the schedule for energy scoring, displaying, by the control unit and through the interface, data that enables a user to provide input to adjust the schedule for energy scoring;
   receiving, by the control unit and through the interface, input that adjusts the schedule for energy scoring;
   based on the input that adjusts the schedule for energy scoring, adjusting, by the control unit, the schedule for energy scoring; and
   calculating, by the control unit, energy scoring based on the adjusted schedule for energy scoring.

5. An electronic system comprising:
   at least one processor; and
   at least one computer-readable storage medium coupled to the at least one processor having stored thereon instructions which, when executed by the at least one processor, causes the at least one processor to perform operations comprising:
   providing, by a control unit of the electronic system, an interface comprising a plurality of input controls that permit a user to customize a manner by which the electronic system monitors energy efficiency at a property, wherein:
      the plurality of input controls comprises (i) a first input control for specifying a frequency with which the electronic system computes one or more energy efficiency scores for the property and (ii) a second input control for specifying how the electronic system provides notifications corresponding to the one or more efficiency scores computed for the property;
      a level of customization permitted through the interface is based on permission settings of a user that accesses the interface;
   receiving, by the control unit and through the interface, a user input, wherein:
      the user input indicates (i) attributes of the property, (ii) a set of preferences, specified by the user, for desired lighting or temperature conditions within the property, (iii) a monitoring schedule with a user-specified frequency for computing the one or more efficiency scores based on interaction with the first input control by the user, and (iv) a user-specified notification preference for providing data to the user based on interaction with the second input control by the user, and
      the control unit is configured to control one or more devices that are monitored by the electronic system based on sensor data collected by one or more sensors of the electronic system located within the property;
   obtaining, by the control unit, sensor data collected by the one or more sensors, the sensor data identifying the one or more devices that are monitored by the electronic system;
   processing, by the control unit, the obtained sensor data with respect to the set of preferences to determine, over a particular time period, energy usage of the one or more devices associated with usage of the one or more devices by the user;
   determining, by the control unit, an amount of energy, at the property over the particular time period, attributable to device usage that contributes to maintaining the desired lighting or temperature conditions specified by the user;
   determining, by the control unit, that the usage of the one or more devices by the user is energy inefficient based on the attributes of the property, the set of preferences for the desired lighting or temperature conditions within the property, and the amount of energy attributable to device usage that contributes to maintain the desired lighting or temperature conditions;
   providing, by the control unit and for output through the interface, a recommendation to change the desired lighting or temperature conditions specified by the user based on the usage of the one or more devices by the user that was determined to be energy inefficient; and
   automatically initiating, by the control unit, a change based on the recommendation to the property based on the determined amount of energy and the determined usage of the one or more devices by the user.

6. The system of claim 5, wherein the operations further comprise:
   tracking the determined amount of energy and the usage of the one or more devices by the user overtime; and
   presenting the determined amount of energy and the usage of the one or more devices by the user tracked overtime through the interface in a manner that enables the user at the property to perceive changes in the property's efficiency overtime.

7. The system of claim 5, wherein the operations further comprise:
   receiving, by the control unit and through the interface, user input requesting display of factors involved in determining the amount of energy; and
   based on the user input requesting display of the factors involved in determining, by the control unit, the amount of energy, displaying the factors involved in determining the amount of energy through the interface.

8. The system of claim 5, wherein the operations further comprise:

receiving, by the control unit and through the interface, user input requesting adjustment of a schedule for energy scoring; and based on the user input requesting adjustment of the schedule for energy scoring, displaying, by the control unit and through the interface, data that enables a user to provide input to adjust the schedule for energy scoring;

receiving, by the control unit and through the interface, input that adjusts the schedule for energy scoring;

based on the input that adjusts the schedule for energy scoring, adjusting, by the control unit, the schedule for energy scoring; and calculating, by the control unit, energy scoring based on the adjusted schedule for energy scoring.

9. The system of claim 5, wherein:

the energy usage of the one or more devices identifies a first set of time segments of the particular time period during which the one or more devices are identified as being turned on;

determining occupancy of the property over the particular time period comprises identifying a second set of time segments of the particular time period during which the property is occupied; and the operations further comprise determining an amount of overlap between the first set of time segments and the second set of time segments over the particular time period; and wherein the amount of energy attributable to device usage is determined based on the amount of overlap between the first set of time segments and the second set of time segments over the particular time period.

* * * * *